United States Patent [19]

Kloner

[11] Patent Number: 4,485,501
[45] Date of Patent: Dec. 4, 1984

[54] WATER SAVING FLUSH TANK MECHANISM

[76] Inventor: Irving I. Kloner, 2484 Prairie Ave., Miami Beach, Fla. 33140

[21] Appl. No.: 490,445

[22] Filed: May 2, 1983

[51] Int. Cl.$^3$ .......................... E03D 1/14; E03D 3/12
[52] U.S. Cl. ............................................. 4/324; 4/325; 4/249; 4/415; 4/405
[58] Field of Search .................... 4/325, 324, 326–327, 4/415, 378, 414, 249, 412, 413, 405

[56] References Cited

U.S. PATENT DOCUMENTS

| | | | |
|---|---|---|---|
| 3,156,930 | 11/1964 | Moulton | 4/325 |
| 3,775,778 | 12/1973 | Lee | 4/325 |
| 3,885,253 | 5/1975 | Overby | 4/325 |
| 3,936,889 | 2/1976 | Wibroe | 4/325 |
| 4,032,997 | 7/1977 | Phripp et al. | 4/415 |
| 4,216,555 | 8/1980 | Detien | 4/324 |
| 4,225,986 | 10/1980 | Mauk | 4/324 |
| 4,433,445 | 2/1984 | Morris et al. | 4/325 |

*Primary Examiner*—Henry K. Artis
*Attorney, Agent, or Firm*—Erwin M. Barnett

[57] ABSTRACT

A toilet flush mechanism conserves water by offering a choice made by the direction of rotation of the flushing handle of either actuating a first lever initiating the discharge of a full tank of water or actuating a second lever initiating the discharge of a predetermined fraction of the water in the full tank, herein designated a mini-flush. A flapper valve controlling the discharge of water from the tank is opened by the actuation of either of the levers, is permitted to close in conventional fashion when the tank is empty upon first lever actuation and is closed by a downward thrust of a striker upon second lever actuation. A water level responsive device including a second float triggers the striker and acts independently of the ballcock valve and float which maintains the full level of water in the conventional manner. A control assembly, which normally locks the water level responsive device thereby preventing operation of the latter during a full tank flush, releases the water level responsive device for triggering the striker upon actuation of the second lever and maintains the released condition until the tank refills after the mini-flush. The first and second levers are pivotally mounted on the interior of the front wall of the tank in the handle region and all other components are supported by a housing secured to the overflow tube of the tank. Adjustability in the water level responsive device permits varying the volume of water discharged in the mini-flush.

14 Claims, 38 Drawing Figures

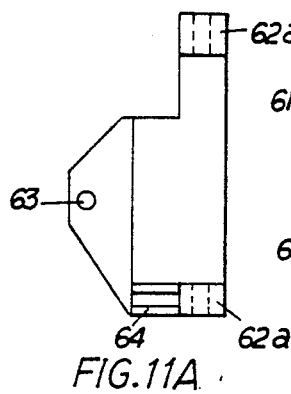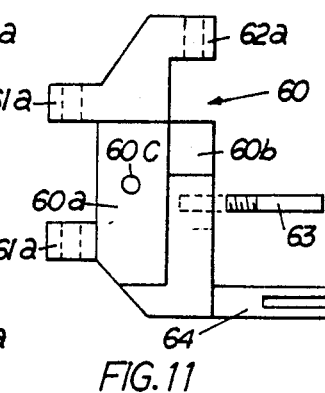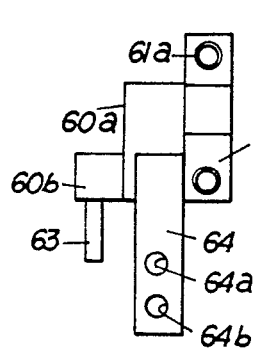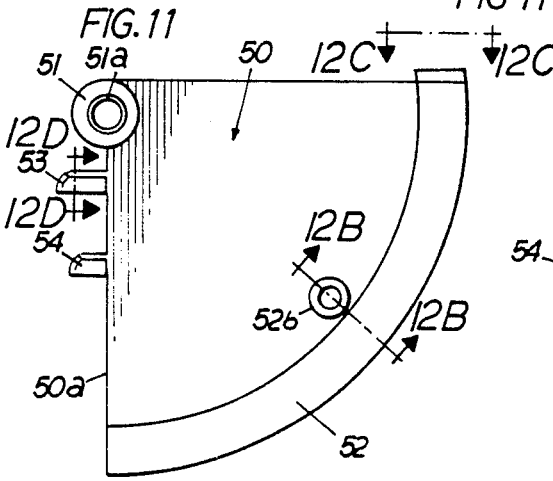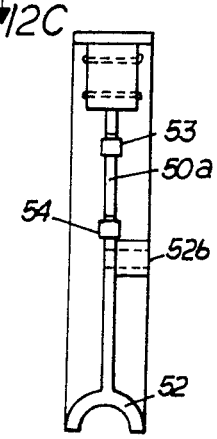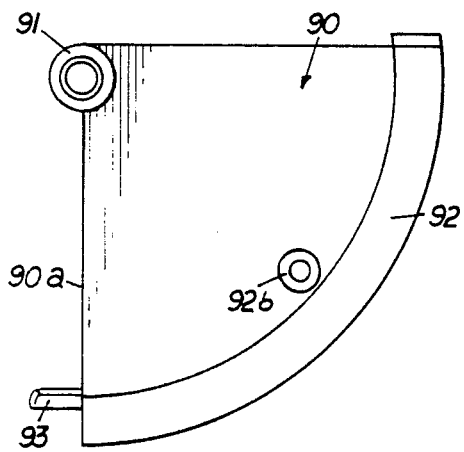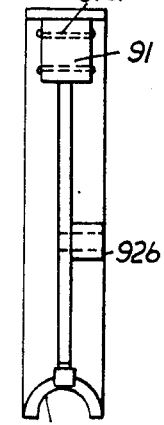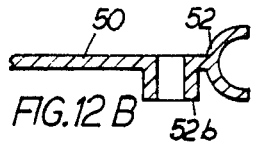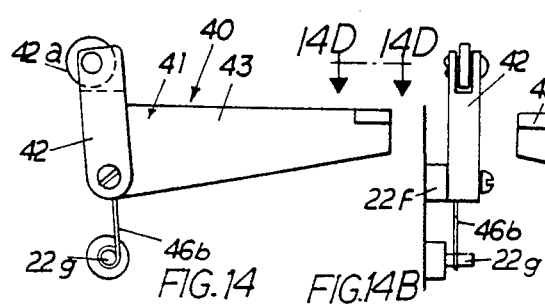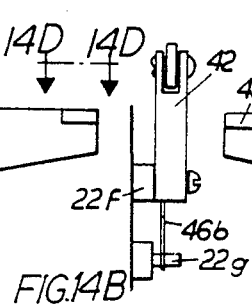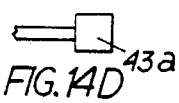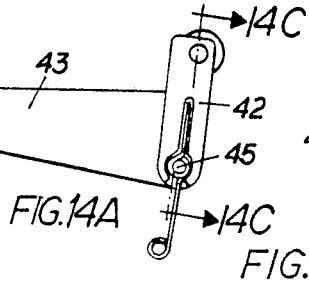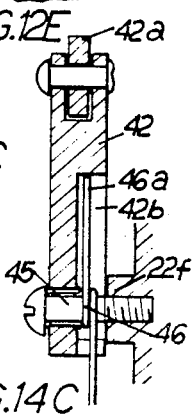

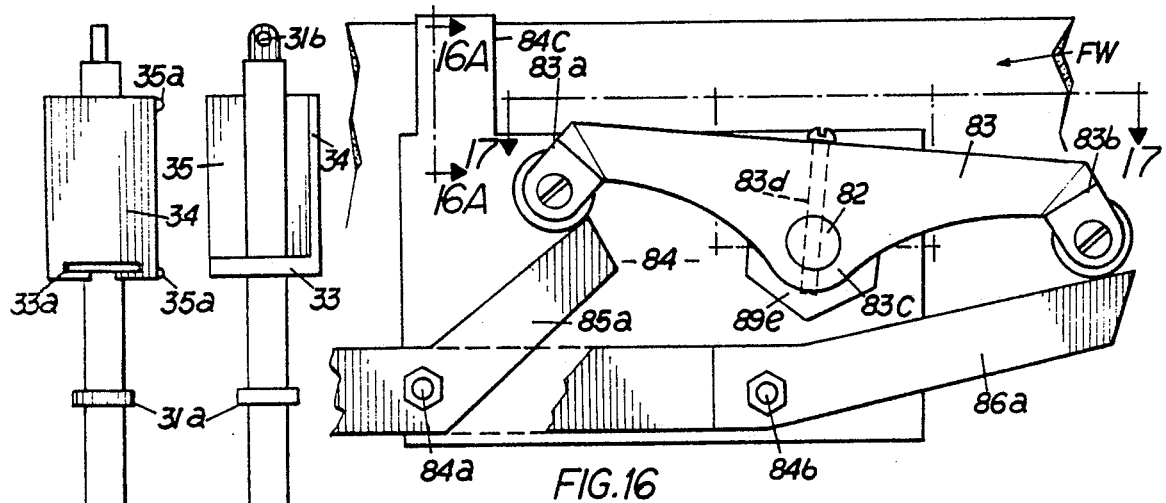
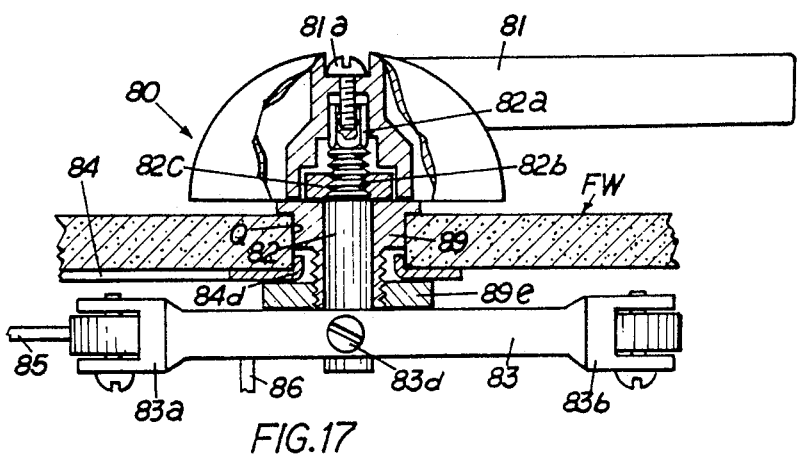
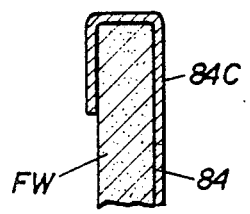
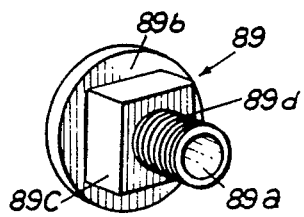

WATER SAVING FLUSH TANK MECHANISM

BACKGROUND OF THE INVENTION

1. Field of the Invention

This invention relates generally to flush tanks for toilets and more particularly is directed to water conservation equipment for such tanks permitting the choice of flushing with either a full tank or a partial tank of water.

2. Description of the Prior Art

Toilet flush tanks, and particularly those used in the home, are notorious wasters of water and although this fact is well recognized, there appears to be no device readily available on the market which provides the user with a choice between a full tank flush and a partial tank flush, enables easy adjustment of the volume of water dispensed by the partial tank flush and which also can be readily installed in existing equipment.

U.S. Pat. No. 3,795,016 granted Mar. 5, 1974 to Edward A. Eastman discloses a device offering the user a choice in flushes between a full tank and a partial tank but in requiring the use of two valve seats and flapper valves lacks the advantages sought in this invention.

SUMMARY OF THE INVENTION

Among the objects of the invention is to conserve water in toilet flushing by providing a flush mechanism whereby the user selects to utilize either a full tank of water, usually about four gallons, or a predetermined lesser volume, such as one gallon or less, which has been found to be sufficient for flushing only liquid waste. The selective flush mechanism shall be readily adaptable for installation in existing conventional flush tanks utilizing the flapper type valve either by a plumber or as a do-it-yourself accessory and also be suitable for incorporation by manufacturers in original flush tank construction. The installed or originally incorporated mechanism shall be easy to operate and to adjust the predetermined lesser volume over a relatively wide range and which shall be efficient and dependable in operation.

The invention features a selective flush mechanism which enables the user, by rotating what appears to be a conventional tank handle in one of the two directions, to choose either a full tank flush, hereinafter designated a maxi-flush, or a lesser volume, that is, a predetermined portion of the full tank, hereinafter designated a mini-flush. The selective flush mechanism, being interposed between the flushing handle and the flapper discharge valve, initiates the conventional discharge of water into the toilet bowl in both maxi-flush and mini-flush operation by raising the flapper valve to the open, unseated, inclined floating position. The maxi-flush permits the tank to discharge fully and the flapper valve to close in the conventional manner. The mini-flush is achieved by triggered action of a striker, spring loaded for rapid downward motion, against the floating flapper when the receding water in the tank reaches a predetermined level causing the flapper to snap into the seated, closed position on the valve seat and thereby cut off further discharge of water from the tank. The selective flush mechanism cooperates with and relies on the normal operation of a conventional ballcock valve and float for filling and maintaining the water in the tank at a desired level to meet maxi-flush requirements and also utilizes its own float during the mini-flush cycle to trigger the striker for cutting off further discharge of water thereby establishing the volume of the mini-flush.

The flush mechanism, when designed for mounting in existing flush tanks, comprises two sections, namely, a handle assembly which is mounted on the interior surface of the front wall of the tank in association with the conventional square opening in the ceramic provided for the usual handle mounting, and a housing constructed for attachment to the upstanding overflow pipe of the tank, which housing supports all the other components. The handle assembly includes a supporting plate located on the interior of the tank on which a pair of levers are pivotally mounted, one lever actuating the maxi-flush, the other lever initiating the mini-flush cycle. The acutuating end of each lever is located for depression by one of the opposite ends of a rocker arm mounted to rotate with the flushing handle whereby clockwise rotation of the latter selectively actuates one of the levers, for example, the maxi-flush lever and counter-clockwise rotation selectively actuates the mini-flush lever, The housing mounts and positions the other components of the flush mechanism, which primarily perform the mini-flush cycle, for coaction with the flapper valve. These components, in addition to the spring loaded striker, comprise a vertically slidable transport, a mini-flush float terminating a pivoted support arm, a spring biased latch for releasably locking the striker in loaded position, a float control assembly and a pivoted quadrant. The striker is mounted on the housing for vertical movement between a raised, flapper clearing, spring loaded position and a lowered flapper striking position. A separate, lost motion linkage connects the striker to each of the mini-flush and maxi-flush levers, which, when actuated by the handle, raises the striker to a loaded position for releasable engagement by the spring biased latch, the lost motion providing for the condition of a previously loaded striker. After a maxi-flush, the striker is always in the loaded, raised position, whereas, at the completion of a mini-flush cycle the striker is always in the lowered position. In addition to reloading the striker, the maxi-flush connects by suitable linkage to raise the flapper valve to open position thereby initiating the maxi-flush.

The float arm and float control assembly both connect to the slidable transport and move in unison therewith. An adjustable contact is also carried by the transport and actuates the spring biased latch to release the striker and close the flapper valve during the mini-flush cycle. Adjustment of this contact predetermines the level to which the water must drop in order to release the striker and thereby determines the volume of water dispensed by the mini-flush. In normal rest position the pivoted quadrant locks the float control assembly which in turn locks the slidable transport, the float arm and the mini-flush float against downward movement and thereby deactivates the components which trigger the striker. The pivoted quadrant connects to the flapper valve and to the mini-flush lever which, when actuated by the handle, initiates the mini-flush cycle by raising the pivoted quadrant thereby opening the flapper valve and releasing the float control assembly. The float control assembly is a delaying action device which prevents the pivoted quadrant from returning to the locking position until the striker is actuated, the flapper valve closed and the tank refills to a predetermined level thereby completing the mini-flush cycle.

BRIEF DESCRIPTION OF THE DRAWINGS

FIG. 11 is a front elevational view of the slidable transport removed from its mounting on the housing, the camlever engaging pin being shown in exploded position.

FIGS. 11A, 11B and 11C are right side elevational, left side elevational and top plan views, respectively, of the slidable transport shown in FIG. 11.

FIG. 12 is a front elevational view of the mini-flush quadrant removed from its mounting on the housing.

FIG. 12A is a left end elevational view of the quadrant shown in FIG. 12.

FIG. 12B is a sectional view taken on line 12B—12B in FIG. 12.

FIG. 12C is a fragmentary top view as seen along line 12C—12C in FIG. 12.

FIG. 12D is a sectional view taken on line 12D—12D in FIG. 12.

FIG. 12E is a sectional view taken on line 12E—12E in FIG. 12C.

FIG. 13 is a front elevational view of the maxi-flush quadrant removed from its mounting on the housing.

FIG. 13A is a left end elevational view of the quadrant shown in FIG. 13.

FIG. 14 is an enlarged detail front elevational view of the bell crank and biasing spring of the latch assembly shown in FIGS. 1 and 2, other components of the mechanism being omitted.

FIG. 14A is a rear elevational view of the bell crank and spring shown in FIG. 14.

FIG. 14B is a left side elevational view of the bell crank and spring shown in FIG. 14.

FIG. 14C is an enlarged sectional view taken on line 14C—14C in FIG. 14A.

FIG. 14D is a fragmentary top plan view as seen along line 14D—14D in FIG. 14.

FIGS. 15 and 15A are enlarged front and right side elevational views, respectively, of the striker rod removed from the assembly as shown in FIGS. 1 and 2.

FIG. 16 is an enlarged rear elevational view of the handle assembly of the selective flush mechanism shown in FIGS. 1 and 2.

FIG. 16A is a fragmentary sectional view taken on line 16A—16A in FIG. 16.

FIG. 17 is a sectional view of the handle assembly taken substantially along line 17—17 in FIG. 16.

FIG. 17A is a rear perspective view of the bushing for the handle shaft shown in section in FIG. 17 removed from the assembly.

DESCRIPTION OF THE PREFERRED EMBODIMENT

Figure 1:
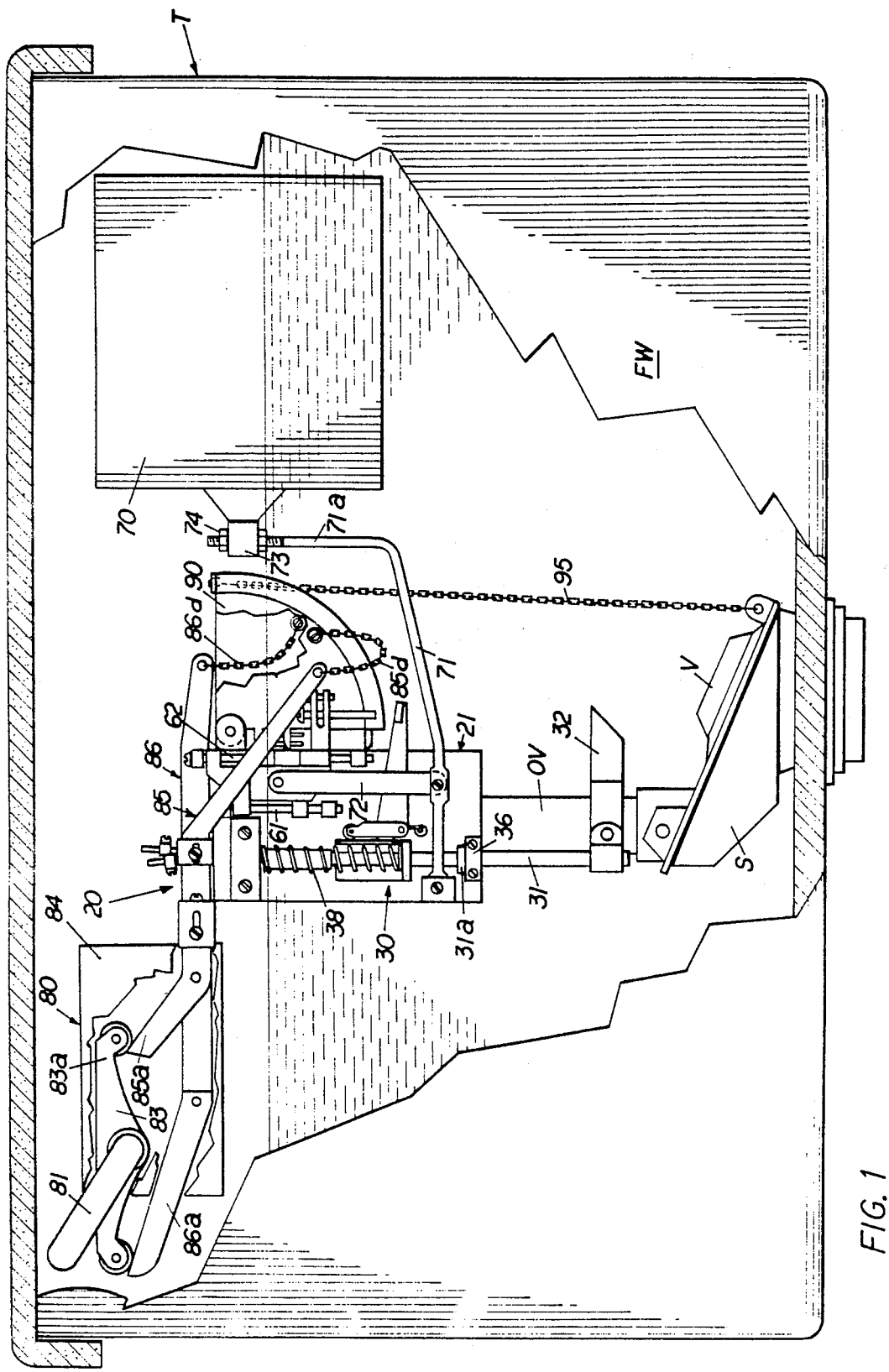
FIG. 1 is a front elevational view of a conventional toilet flush tank with the front wall broken away to show the selective flush mechanism embodying the invention installed therein, the tank being shown filled with water and the mechanism in a position after a previous mini-flush, the tank filling inlet valve mechanism and ballcock being omitted.
Figure 2:
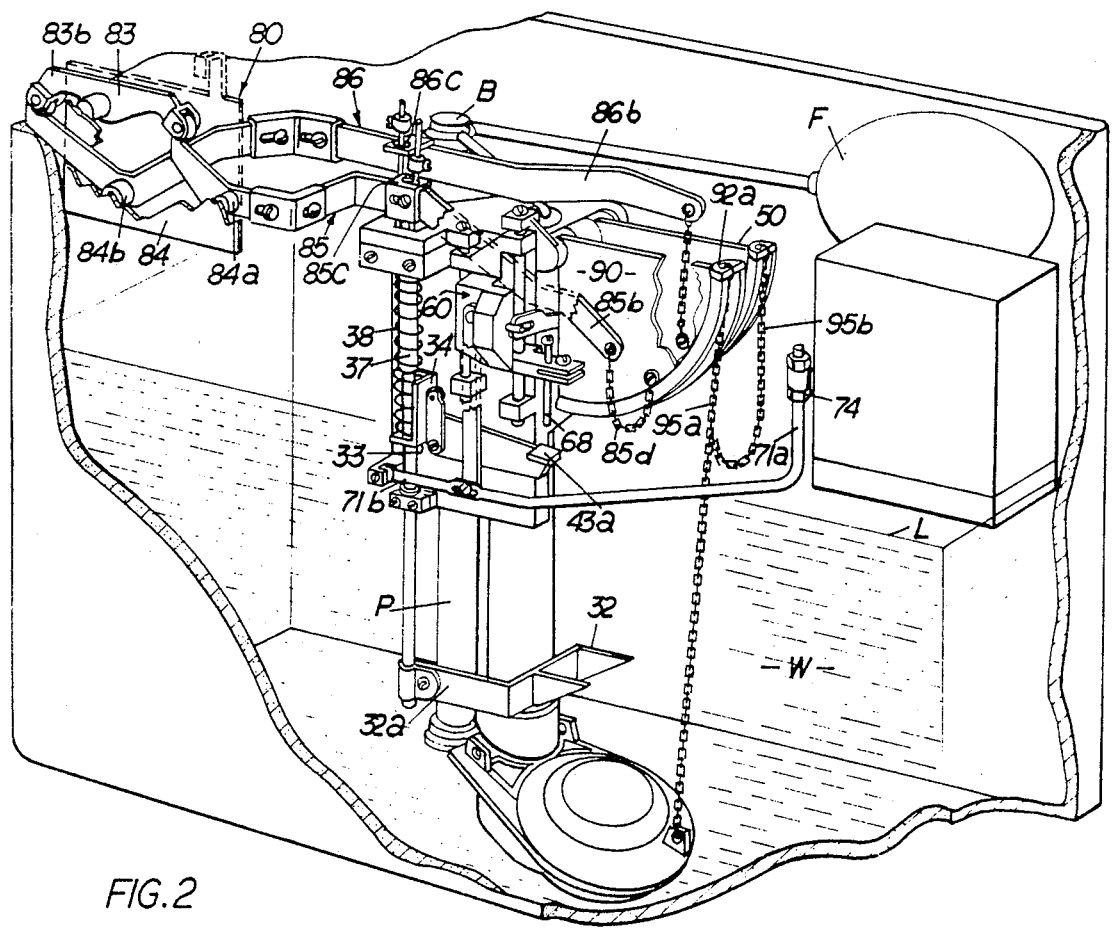
FIG. 2 is a perspective view as seen from the front right corner of the tank with parts of the tank walls broken away showing the selective flush mechanism installation in the position shown in FIG. 1.

Referring in detail to the drawings, 20 generally denotes the selective flush mechanism, embodying the invention, shown in FIGS. 1 and 2 installed in a toilet flush tank T provided with an overflow tube OV, a water supply pipe P having a ballcock valve B operated by a valve float F to maintain a predetermined full tank level L of water W and an outlet valve seat S having a flapper valve V, all of well known conventional construction.

Figure 3:
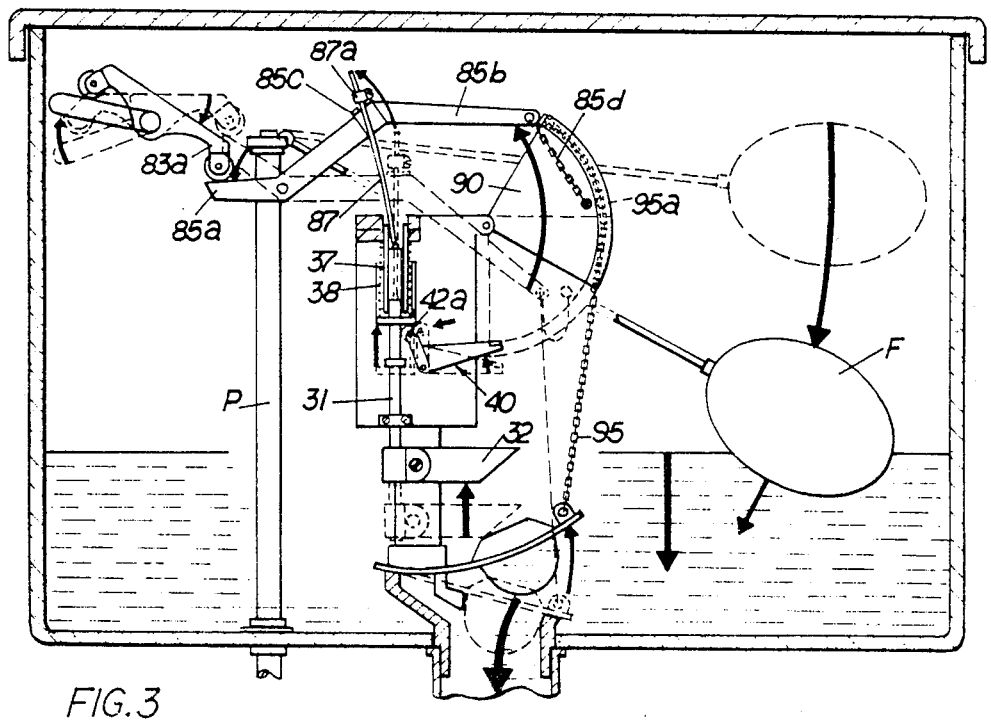
FIG. 3 is a front elevational view diagrammatically representing the components involved in a maxi-flush, the positions thereof being shown after the operating handle has been moved clockwise to initiate the maxi-flush and the water level has dropped to about a half-way mark during the flush, the mini-flush actuating float and related elements being omitted.
Figure 4:
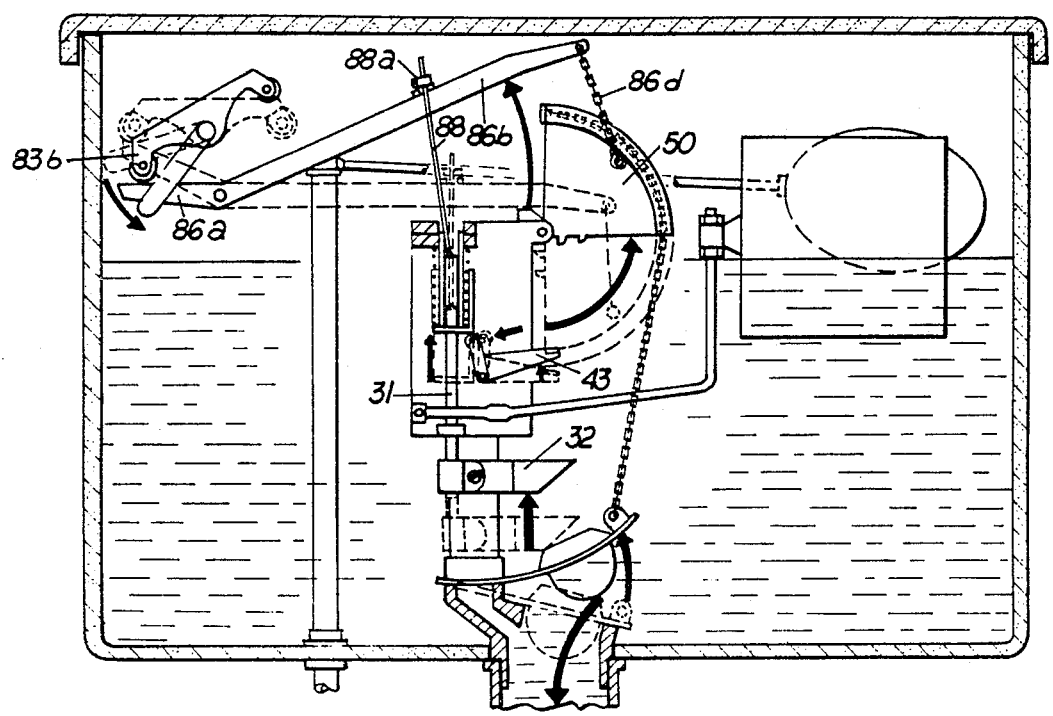
FIG. 4 is a front elevational view diagrammatically representing selected components involved in initiating the mini-flush, the positions thereof being shown after the operating handle has been moved counter-clockwise.

Selective flush mechanism 20 includes a handle assembly 80, mounted on the front wall FW of tank T as a replacement for any conventional handle, shown generally in FIGS. 1, 2 and 3 to comprise handle 81 and rocker arm 83, both mounted to turn with shaft 82 extending through the front wall FW of tank T and through a mounting plate 84 which carries a Pair of spaced pivot pins 84a and 84b pivotally mounting maxi-flush lever 85 and mini-flush lever 86, respectively. Relatively shorter ends 85a and 86a of levers 85 and 86 extend beneath the opposite rocker arm ends 83a and 83b, respectively, for selective engagement and depression when rocker arm 83 is rotated by handle 81. Thus, as shown in FIG. 3, clockwise rotation of handle 81 and rocker arm 83 causes the right end 83a of the latter to actuate maxi-flush lever 85 by depressing end 85a thereof and, as seen in FIG. 4, counter-clockwise rotation of handle 81 and rocker arm 83 causes the left end 83b of the latter to actuate mini-flush lever 86 by depressing end 86a thereof. The opposite longer or actuating sections 85b and 86b of levers 85 and 86, respectively, seen in the drawings as extending toward the right from pivot pins 84a and 84b, are suitably sized, shaped and provided with adjustment means to fit tanks of various sizes and are provided with fittings for support in normal rest positions, as seen in FIGS. 1 and 2, and to perform their two-fold function hereinafter described.

All other components of mechanism 20 are mounted on housing 21 which is molded of a suitable plastic material, for example PVC (polyvinyl chloride), ABS (acrylonitrile butadiene styrene) or the like. As seen in FIGS. 10, 10A, 10B, 10C and 10D, housing 21 comprises front sidewall 22, adjacent right sidewall 23 and top wall 24 is attached to overflow tube OV by any suitable means, such as, hinged strap 21a secured by thumb screw 21b which may be threaded into the wall of a rearward depression 21d in front sidewall 22. Hinged strap 21a may clampingly coact with the arcuate edge of one or more interior transverse walls 21c. Top wall 24, which seats on overflow tube OV, has an opening 24a registering with and of a diameter substantially equal to the ID of tube OV.

Those components of mechanism 20 mounted on housing 21 comprise a striker 30 releasably retained in a raised, loaded position, as seen in FIG. 3, by latch assembly 40, a vertically slidable transport 60 mounting an adjustable contact 68 for actuating latch assembly 40, a mini-flush float 70 mounted on pivoted float arm 71, a float control assembly 55, and pivoted quadrants 50 and 90.

Figure 9:
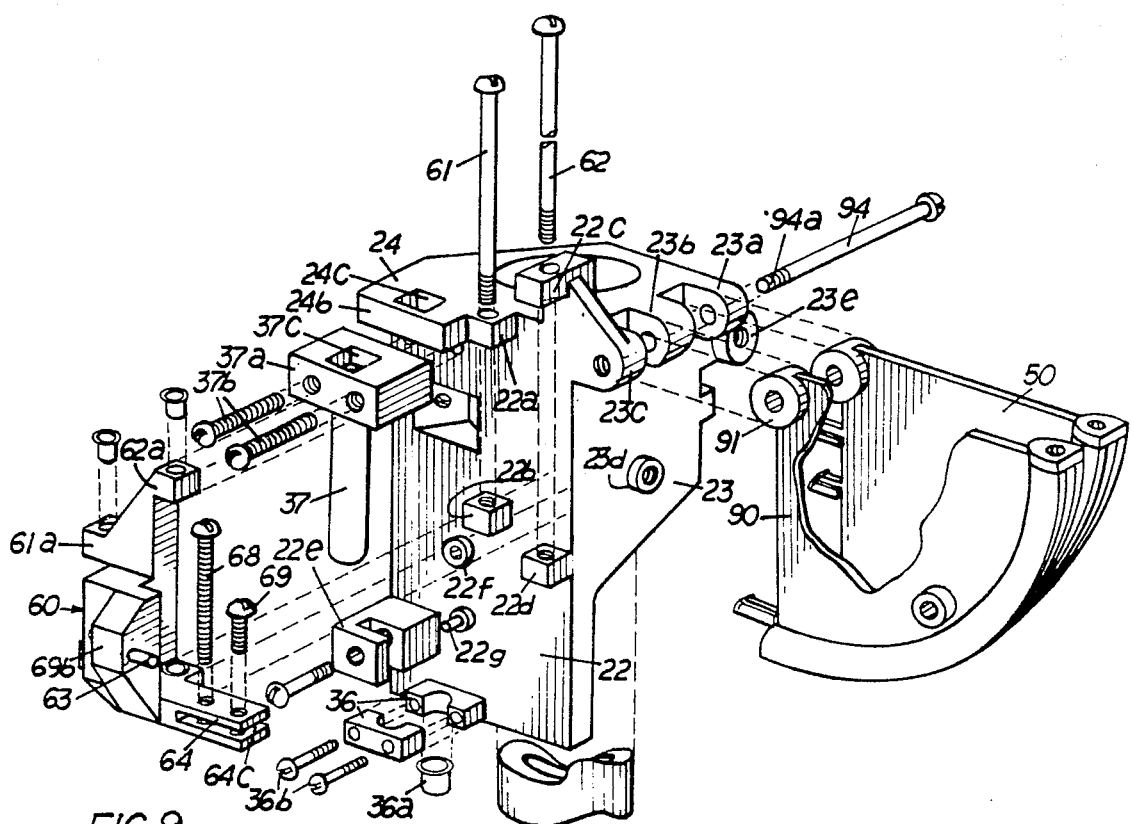
FIG. 9 is an enlarged exploded perspective view of the housing and associated components of the mechanism embodying the invention showing details of construction.
Figure 10B:
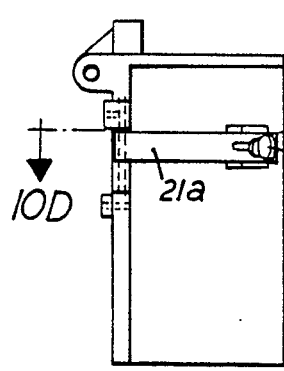
FIGS. 10A, 10B and 10C are right side elevational, rear elevational and top plan views, respectively, of the housing shown in FIG. 10.
Figure 10A:
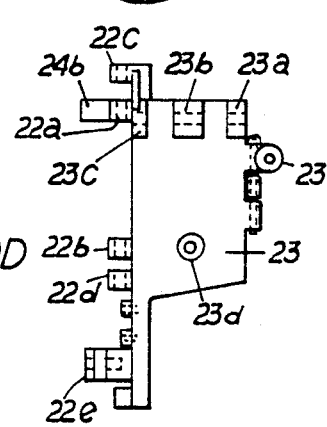
Figure 10:
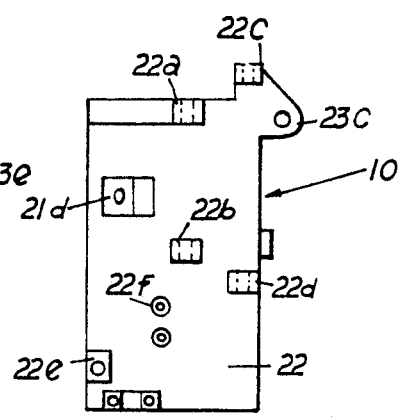
FIG. 10 is a front elevational view of the housing shown in FIGS. 1, 2 and 9 removed from the assembly.
Figure 10C:
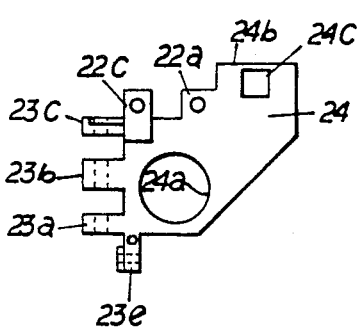
Figure 10D:
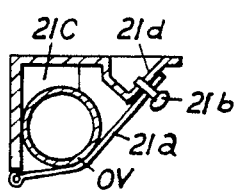
FIG. 10D is a sectional view taken on line 10D—10D in FIG. 10B but also including the overflow tube of the toilet tank to show the bracket mounting of the housing.

Pivoted quadrant 50 and a companion quadrant 90 are both positioned side-by-side to project perpendicularly from right sidewall 23 and, as seen in FIGS. 9, 12 and 13, have integrally formed bearing blocks 51 and 91 for pivoting on a suitable pin, such as bolt 94 extending through aligned bores formed in spaced bosses 23a, 23b and 23c located adjacent top wall 24. Bolt 94 may have a threaded end 94a for engaging a suitable retaining nut, or as shown, threads provided in the bore of boss 23c. Quadrants 50 and 90, being substantially similar except for the latching means provided on quadrant 50, may be molded of a plastic material similar to housing 21, have an overall configuration similar to the quadrant of a circle with bearing blocks 51 and 91, which may be reinforced with metal sleeves 51a and 91a, respectively, having pivotal axes at the center of such circle. The peripheries of quadrants 50 and 90 are formed as channels 52 and 92 with eyelets 52a and 92a located at the upper ends thereof to which branches 95b and 95a, respectively, of pull chain 95 are attached. Threaded bosses 52b and 92b are also provided at suitable locations to which the lower ends of short chains 86d and 85d suspended from mini-flush lever 86 and maxi-flush lever 85, respectively, are attached by suitable screws. As seen in FIGS. 12 and 12A, a relatively longer, upper latch pin 53 and a relatively shorter, lower latch pin 54 are integrally formed to project perpendicularly from vertical side edge 50a of quadrant 50. A projection 93 extends from vertical side edge 90a and serves as a stop against right sidewall 23 to align quadrant 90 in a normal rest position.

Figures 7, 8:
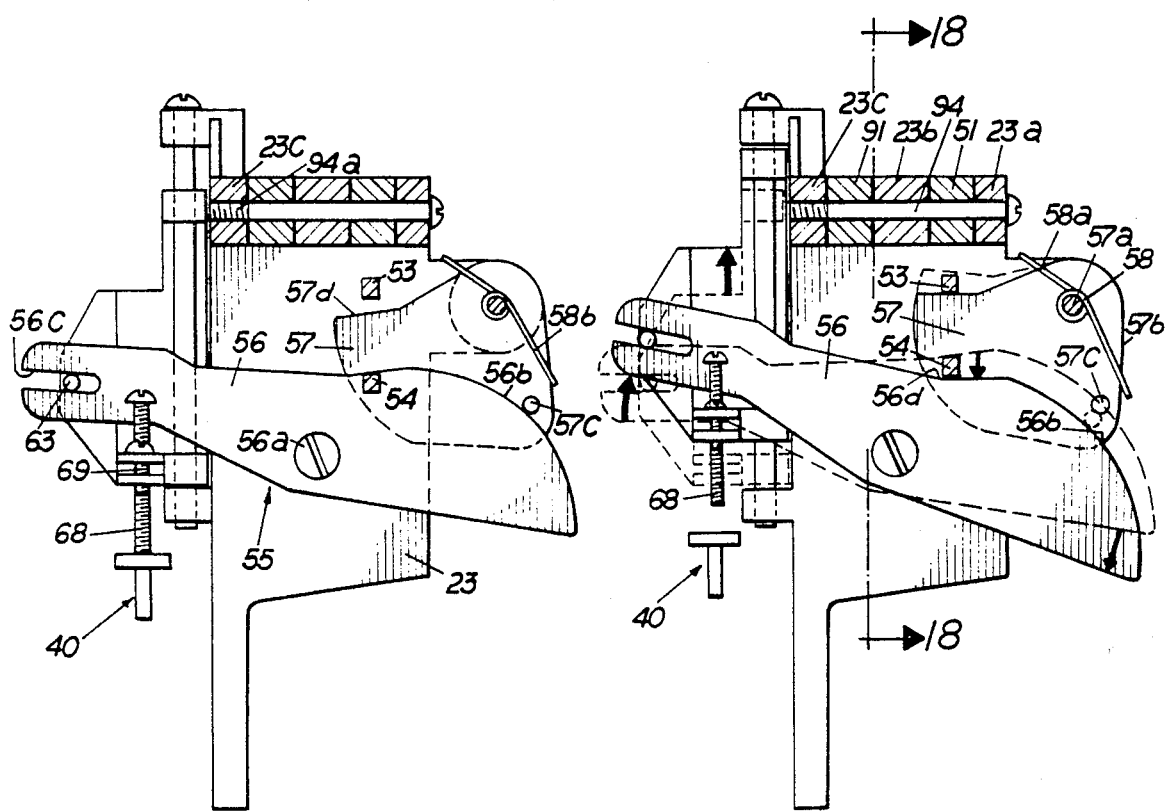
FIG. 7 is a vertical sectional view taken on line 7—7 in FIG. 5 showing the released float control assembly in a lowered position.
FIG. 8 is a vertical sectional view taken on line 8—8 in FIG. 6 showing the float control assembly at rest in a raised and locked position.
Figure 18:
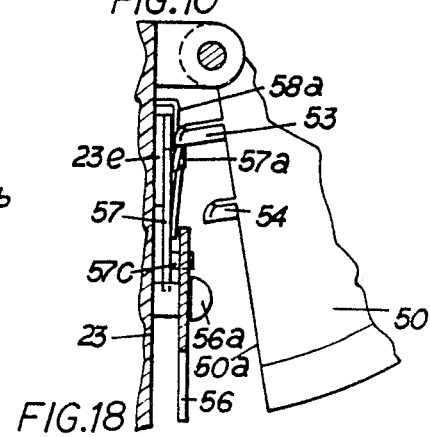
FIG. 18 is a vertical sectional view taken on line 18—18 in FIG. 8 but showing the components of the float control assembly and the mini-flush quadrant in the position after actuation of a mini-flush when the handle is immediately released and prior to any significant drop of water level in the tank.

Float control assembly 55, seen in FIGS. 7, 8 and 18, generally comprises a cam-lever 56 pivotally mounted at a midportion thereof, such as by a screw 56a threaded into boss 23d projecting from right sidewall 23 and a spring biased flag-cam 57 pivotally mounted, as by a screw 57a on boss 23e projecting rearwardly from right sidewall 23. Cam-lever 56 extends in parallel spaced relation to right sidewall 23 with flag-cam 57 partially interposed therebetween. The biasing of flag-cam 57 for pivoting on screw 57a in a clockwise direction, as seen in FIG. 8, may be suitably accomplished by a wire spring 58 wound on screw 57a with one end 58a engaging boss 23e and the opposite end 58b engaging right edge 57b of flag-cam 57. A pin 57c extends perpendicularly from the lower right surface portion of flag-cam 57 for engaging curved right upper cam edge 56b of cam-lever 56 during the operation of assembly 55 as hereinafter described. The left end of cam-lever 56 projects beyond front sidewall 22 and is forked to provide an open ended slot 56c in which pin 63 projecting from slidable transport 60 rides as a connection between the latter and float control assembly 55. Cam-lever 56 and flag-cam 57 have upper edge portions 56d and 57d across which lower latch pin 54 and upper latch pin 53, respectively, extend for locking assembly 55 and particularly preventing cam-lever 56 from counter-clockwise rotation when quadrant 50 is in a normal rest position.

Slidable transport 60 is suitably mounted on front sidewall 22 for limited vertical movement. As shown in FIGS. 1, 2 and 9, such mounting comprises a pair of spaced vertical rods 61 and 62 supported at opposite ends in aligned bosses 22a, 22b and 22c, 22d, respectively, integrally formed with front sidewall 22. As shown in FIGS. 11, 11A, 11B and 11C, transport 60, which may also be molded of a plastic material, has pairs of spaced bearing blocks 61a and 62a aligned and located for sliding support on rods 61 and 62, respectively. A front face portion 60a accommodates the upper end of a vertically extending link 72 of float arm 71 and provides for pivotal attachment thereof, such as by a pivot pin anchored in an opening 60c in face portion 60a. A ridge 60b projects forwardly along the right side of face portion 60a and mounts laterally projecting pin 63 which extends beyond right sidewall 23 and engages the open ended slot 56c of cam-lever 56. A suitable mounting for adjustable contact 68 is formed as a bar 64 laterally projecting from the lower right corner of transport 60, bar 64 having a vertical threaded opening 64a through which contact 68 threads, the latter being in the form of a screw having an end aligned to engage platform 43a of latch assembly 40. Suitable set screw means for locking contact 68 in an adjusted position is provided and is here shown as a set screw 69 threaded through another opening 64b adjacent opening 64a. The end portion of bar 64 through which openings 64a and 64b extend is divided by a horizontal slit 64c enabling set screw 69 to compress bar 64 to lock contact 68 in an adjusted position.

Latch assembly 40 comprises a bell crank 41 mounted on pivot pin 45 formed as a shoulder screw and threaded into boss 22f integrally formed on front sidewall 22. One arm 42 of bell crank 41 extends in an upward direction from pivot pin 45 to releasably engage, in detent fashion, shoulder 33 of striker rod 31 and may be provided at the end thereof with a roller 42a to reduce friction between the moving parts. The other arm 43 extends in a horizontal direction having a terminal platform 43a which extends below contact 68 for actuation thereby to trigger the closing of flapper valve V during the mini-flush cycle. A wire spring 46 wound around pin 45 biases bell crank 41 in a counter-clockwise direction as seen in FIG. 1 by having one end 46a extending through cutout 42b in arm 42 and the opposite end 46b anchored to a pin 22g which may be integrally formed to extend from front sidewall 22 below boss 22f.

Striker 30 is seen in FIGS. 1, 2, 3, 15 and 15A to comprise a vertically mounted elongated rod 31, the lower end of which mounts a pair of spaced bumpers 32 positioned in vertical alignment above flapper valve V by a bracket 32a suitably shaped to accommodate the horizontal offset between flapper valve V and rod 31. Rod 31 is mounted on front sidewall 22 for limited vertical reciprocating motion in close proximity to latch assembly 40 by support means shown to include a split bearing block 36 located adjacent the bottom edge of front sidewall 22 and a tube 37 into which the upper end of rod 31 extends. Bearing block 36, as seen in FIG. 9, may be fitted with a bearing sleeve 36a and retained in assembly by a pair of screws 36b. Tube 37 is suspended in spaced relation from the surface of front sidewall 22 and may be integrally formed at the upper end thereof with a mounting block 37a secured by screws 37b to front sidewall 22 and fitted beneath an overhang 24b projecting from top wall 24. The upper end of the bore of tube 37 communicates with an enlarged opening 37c in the top of block 37a which in turn registers with a similarly sized opening 24c in overhang 24b. A collar 31a, either integrally formed on rod 31, as shown, or provided as a separate, set screw or otherwise fastened, element, is located for engagement with bearing block 36 to limit the downward thrust of rod 31 to a predetermined lowered position. The upper end of rod 31 which reciprocates within the bore of tube 37 is formed with an eyelet 31b to which a pair of flexible wires 87 and 88 are attached. Wires 87 and 88 extend upwardly through openings 37c and 24c as lost motion connections to maxi-flush lever 85 and mini-flush lever 86, respectively. Bell crank 41 and rod 31 may also be molded of a plastic material similar to housing 21.

A horizontal shoulder 33 is integrally formed on rod 31 located below the free end of tube 37 and projects for engagement by roller 42a of bell crank 41. As seen in FIGS. 15 and 15A, shoulder 33 may be provided with a metal reinforcing strip or insert 33a exposed for engaging roller 42a and also has a square contour to conform to a pair of vertically extending walls 34 and 35 arranged in right angular relation and spaced from rod 31. Wall 34 extends from the right edge of shoulder 33 and provides a track along which roller 42a rides when released from engagement under shoulder 33. Wall 35 extends from the rear edge of shoulder 33 in close parallel proximity to front sidewall 22 and may be formed with a plurality of spaced nubs 35a, such as at the corners of wall 35, for sliding contact with front sidewall 22 to prevent undesirable axial rotation of rod 31. Alternatively, other means may be provided for preventing such axial rotation, for example, a key and groove arrangement between rod 31 and bearing block 36. Walls 34 and 35 are sufficiently spaced from rod 31 to accommodate therebetween compression spring 38 which also surrounds tube 37 and acts between supporting block 37a and the interior of shoulder 33 providing the downward thrust for striker 30 when released by latch assembly 40.

Mini-flush float 70 is seen to be a relatively thin structure sized to fit in tank T between the front wall FW and ballcock valve float F. A sleeve 73 is mounted to extend parallel to a vertical side of float 70 and fits onto the threaded upper end of vertically disposed end section 71a of float arm 71. Vertical adjustability of float 70 is accomplished in the well known manner by a pair of nuts 74 threaded on end section 71a for tightening against the opposite ends of sleeve 73. The opposite end 71b of float arm 71 is pivoted to an integrally formed boss 22e projecting from front sidewall 22. Link 72 connects a midportion of arm 71 to transport 60 by suitable pivotal attachments at opposite ends thereof.

Sections 85b and 86b of maxi-flush lever 85 and mini-flush lever 86 extend in spaced relation on either side of opening 24c in top wall overhang 24b and have fittings which support levers 85 and 86 in a normal, horizontally disposed, rest position on top wall 24. These fittings may also have horizontally disposed portions 85c and 86c, as seen in FIG. 2, extending toward each other above opening 24c and formed with suitable slots through which the upper ends of wires 87 and 88, respectively, extend. Adjustable collars 87a and 88a are secured to wires 87 and 88 at locations slightly spaced above fitting portions 85c and 86c, respectively, when striker 30 is in lowered position seen in FIG. 2. Either collar 87a or 88a is thus positioned to be engaged by fitting portion 85c or 86c when either lever 85 or 86 is actuated whereby wire 87 or 88 raises striker rod 31 to the loaded position as illustrated in FIG. 3 or 4, respectively. The ends of lever sections 85b and 86b are formed with suitable openings into which the upper ends of short chains 85d and 86d, respectively, connect.

The mounting for handle assembly 80 on front wall FW of tank T and particularly in relation to the conventional square opening Q provided therein for handle mounting is shown in detail in FIGS. 16, 16A 17 and 17A. Mounting plate 84, which abuts the inner surface of front wall FW, may have a stabilizing extension 84c which loops over the upper edge of front wall FW and a square opening with inturned edges 84d engaging the edges of opening Q. A bushing 89, having a circular bore 89a in which shaft 82 rotates, has a circular flange 89b abutting the front surface of front wall FW, a square midportion 89c conforming to opening Q and a threaded rear end 89d which projects through opening Q and the opening in plate 84 and receives thereon nut 89e sized to also lock plate 84 in position. Shaft 82 has a front end 82a of square or other noncircular cross-section to fit into the conforming bore of handle 81 and the usual threaded axial bore to receive set screw 81a securing handle 81 thereto. Shaft 82 may also be formed with a threaded portion 82b extending forwardly beyond bushing 89 for a retaining nut 82c. The opposite, inner end of shaft 82 is provided with suitable means for mounting rocker arm 83 to turn therewith. Thus, hub 83c of rocker arm 83 is secured in abutment with nut 89e by set screw 83d extending diametrically through hub 83c and shaft 82, either the diametric bore of hub 83c or of shaft 82 which accommodate screw 83d being threaded for the purpose.

The operation of selective flush mechanism 20 installed in tank T as hereinbefore described will now be apparent. Mechanism 20 is shown in FIGS. 1 and 2 at rest with quadrant 50 and 90 in their normal downwardly suspended positions wherein projection 93 and latch pin 53 rest against sidewall 23 and latch pins 53 and 54, extending across upper edge portions 57d and 56d, lockingly engage flag-cam 57 and cam-lever 56, respectively. Cam-lever 56, through the engagement of pin 63 in slot 56c, when locked by latch pin 54, in turn locks float 70 against falling below a predetermined level unless specifically released as hereinafter described during the mini-flush cycle. Thus, commencing with mechanism 20 in the position shown in FIGS. 1 and 2 in which tank T is filled with water W to a level L as predetermined by ballcock valve B and float F and striker 30 is in a lowered position, as after a mini-flush cycle, a maxi-flush is initiated by rotating handle 81 in a clockwise direction. This causes rocker arm end 83a to depress end 85a of maxi-flush lever 85 thereby rotating the latter in a counter-clockwise direction to raise long end 85b which performs the dual function of pulling up on short chain 85d and, through the engagement of fitting portion 85c with collar 87a, also pulling up on wire 87. As illustrated in FIG. 3, pulling up on wire 87 raises rod 31 from the lowered position, indicated in broken lines, to the raised position, shown in full lines, wherein compression spring 38 is loaded and roller 42a of bell crank 41 engages shoulder 33 to latch striker 30 in raised position with bumpers 32 completely clearing flapper valve V. The pulling up on short chain 85d rotates quadrant 90 upwardly which, by means of chain branch 95a, cradled in channel 92, and pull chain 95, opens flapper valve V permitting the flow of water W from tank T. This flow proceeds in the conventional fashion until flapper valve V closes when tank T is empty. Float 70 remains supported in the normal, raised, rest position, shown in FIGS. 1 and 2, during the entire maxi-flush cycle. It will also be clear that striker 30 will remain latched in the raised position shown in FIG. 3 until released during a subsequent mini-flush cycle as hereinafter described. With rod 31 in this raised position, the lost motion action permits wires 87 and 88 to remain in extended positions above fitting portions 85c and 86c while levers 85 and 86, respectively, are at rest.

Figure 5:
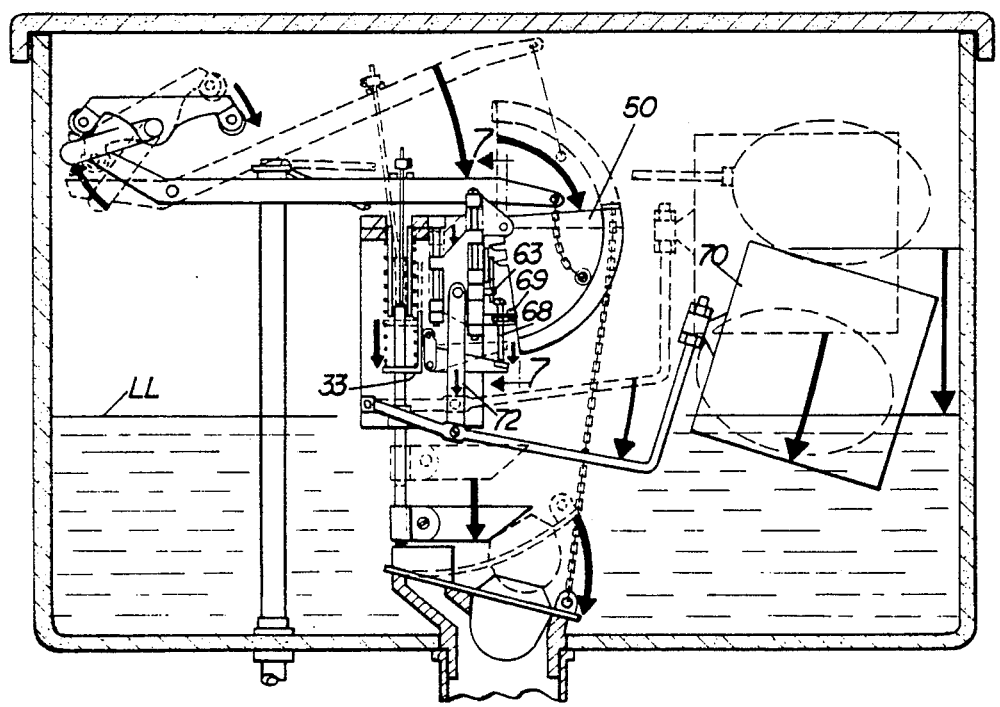
FIG. 5 is a front elevational view diagrammatically representing the components involved in the mini-flush positioned just after the water has reached the predetermined level whereat the mini-flush float has triggered the closing of the flapper valve.

Rotation of handle 81 in a counter-clockwise direction initiates a mini-flush cycle, as illustrated in FIG. 4, by depressing end 86a of mini-flush lever 86 and raising long end section 86b which also performs a dual function similar to that of lever 85. If striker 30 is not already latched in the raised position, collar 88a of wire 88 is engaged by fitting portion 86c to raise and latch rod 31. Lever end section 86b pulls up on short chain 86d which upwardly rotates quadrant 50 for immediately releasing float control assembly 55 by disengagement of upper and lower latch pins 53 and 54 from flag-cam 57 and cam-lever 56, respectively. Also, through chain branch 95b, cradled in channel 52, and pull chain 95, rotation of quadrant 50 opens flapper valve V. The release of float control assembly 55 permits float 70 to follow the level of water W in delivering the mini-flush from tank T, and, through link 72 to move transport 60 downwardly until, at the predetermined level LL seen in FIG. 5, contact 68 engages platform 43a and rotates bell crank 41 in a clockwise direction, disengaging roller 42a from shoulder 33. This triggers the rapid downward movement of rod 31 propelled by spring 38 so that the downward thrust by bumpers 32 against open flapper valve V causes the latter to close.

Figure 6:
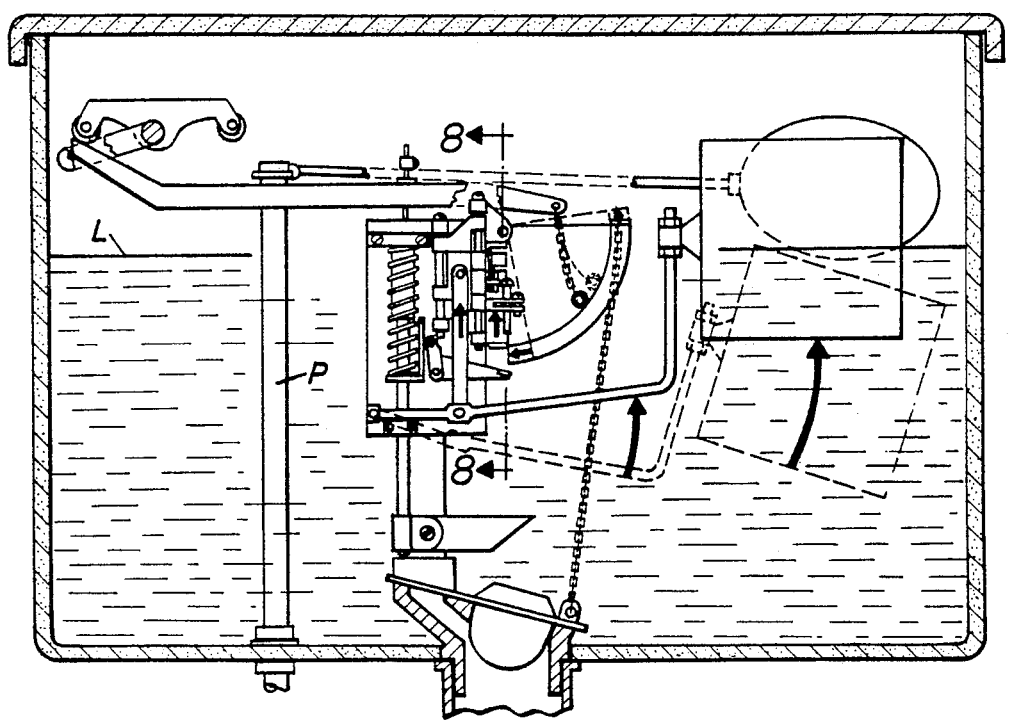
FIG. 6 is a front elevational view similar to FIG. 5 but showing the components in a normal, rest position at the completion of the mini-flush cycle after the mini-flush float has been returned to a raised position by the refilling of the tank.

The operation of flag-cam 57 and cam-lever 56 of float control assembly 55 permits free action of float 70 during the entire mini-flush cycle which includes the refilling of tank T after flapper valve V has been closed by striker 30. As will be clear from FIGS. 7, 8 and 18, assuming immediate release of handle 81, quadrant 50 will drop before sufficient time has elapsed to permit the drop in the level of water W to lower float 70 and, through link 72, transport 60 and pin 63, to rotate cam-lever 56 counter-clockwise to a sufficient degree for latch pin 54 to contact the face of cam-lever 56. The provision of flag-cam 57 prevents untimely engagement of latch pin 54 with upper edge portion 56d resulting in a maxi-flush due to premature locking of float 70. Flag-cam 57, being retained in rest position by latch pin 53 with pin 57c spaced away from engagement with curved upper cam edge 56b of cam-lever 56 as shown in full lines in FIG. 8, is immediately released by the upward rotation of quadrant 50 upon initiation of the mimi-flush and rotates in a clockwise direction by the action of spring 58 to the position shown in broken lines in FIG. 8. In this position pin 57c now engages curved upper cam edge 56b and the upper edge portion 57d is above the path of latch pin 53 so that the face of flag-cam 57 will be contacted by the free end of latch pin 53, as shown in FIG. 18, as quadrant 50 drops by gravity toward rest position. This contact maintains cam-lever 56 free of locking engagement by latch pin 54 and provides for free movement of float 70 and associated components. As the level of water W drops during the mini-flush, cam-lever 56 rotates in a counter-clockwise direction and, in so doing, the engagement of pin 57c with curved upper cam edge 56b likewise rotates flag-cam 57 in a counter-clockwise direction until upper edge portion 57d drops below latch pin 53 releasing quadrant 50 for further movement toward rest position. This coaction between curved upper cam edge 56b and pin 57c permits the release of quadrant 50 to occur only after the face of cam-lever 56 has been positioned for engagement by latch pin 54 so that freedom of movement of float 70 and transport 60 is maintained to respond to the level of water W. As this level approaches the predetermined level LL indicated in FIG. 5 at which the mini-flush discharge is to be terminated, contact 68 engages platform 43a whereby latch assembly 40 triggers striker 30 to close flapper valve V and complete the discharge portion of the mini-flush cycle. The position of the components of the float control assembly 55 at the time flapper valve V is closed by bumpers 32 is shown in FIG. 7. As tank T refills to complete the mini-cycle, float 70 and transport 60 both rise, rotating cam-lever 56 in a clockwise direction. As the rising water approaches level L shown in FIG. 6, upper edge portion 56d moves below latch pin 54 enabling quadrant 50 to return by gravity to rest position wherein latch pin 53 contacts right sidewall 23 and latch pin 54 extends in locking engagement across upper edge portion 56d as seen in full lines in FIG. 8. During this clockwise rotation of cam-lever 56, flag-cam 57 is urged by spring 58 to also rotate in a clockwise direction with pin 57c contacting curved upper cam edge 56b until upper edge portion 57d engages latch pin 53 preventing further rotation of flag-cam 57. Thus, as cam-lever 56 continues clockwise rotation in returning to latched position, pin 57c becomes disengaged and is spaced from curved upper cam edge 56b, as seen in FIG. 8, positioning flag-cam 57 for its above described function upon initiation of the next mini-flush.

Each of the latch pins 53 and 54, as well as projection 93, may have a metal reinforcement, such as clip 53a seen in FIG. 12D, provided as friction and wear reducing means. Other metal bushings, reinforcement fittings and threaded sleeve inserts in place of integral plastic threads may be utilized as appropriate with the molded plastic parts of mechanism 20.

In the installation of mechanism 20, float 70 is positioned on vertical end section 71a of float arm 71, using the adjustability provided by nuts 74, so that transport 60 is located slightly below the uppermost position as limited by bosses 22a and 22c when water W is at full tank level L, seen in FIGS. 1 and 2, as controlled by float F and ballcock valve B which also may be adjusted as required. To insure locking of float control assembly 55 quadrant 50 after each refilling of tank T, the components are proportioned and located so that the locking engagement of latch pin 54 with upper edge portion 56d occurs at a water level below level L, there being no constraint on clockwise rotation of lever-arm 56 by latch pin 54.

The predetermined level LL of water W and hence the desired volume of water to be discharged during a mini-flush may be readily adjusted by adjusting contact 68, the heads of the screw forming contact 58 and set screw 69 both being accessible to a screwdriver from above. The mini-flush volume of water is decreased by downward adjustment of contact 68 and increased by upward adjustment.

From an understanding of the operation of mechanism 20, it will be clear that, as an alternative, the end of actuating section 85b of maxi-flush lever 85 may be directly connected by suitable means to pull chain 95 or to flapper valve V and, if necessary, the configuration of section 85b changed to better accommodate such connection, thus eliminating quadrant 90.

The selective flush mechanism for saving water herein disclosed is seen to achieve the several objects of the invention and to be well adapted to meet conditions of practical use. As various possible embodiments might be made of this invention, and as various changes might be made in the disclosed mechanism, it is to be understood that all matters herein set forth or shown in the accompanying drawings are to be interpreted as illustrative and not in a limiting sense.

What is claimed is:

1. In a toilet flush tank having an overflow tube, a valve seat associated with said tube through which water from the tank discharges into the toilet bowl, a flapper valve for said valve seat, and a ballcock valve and float for maintaining the water in said tank at a full level; a selective flush mechanism comprising a first operating means opening said flapper valve to initiate discharge of a full tank of water, a second operating means opening said flapper valve to initiate discharge of a fractional portion of said tank of water indicated by a drop in the level of water from the full tank level to a predetermined lower level, a handle having means for selectively actuating either said first or second operating means, water level responsive means normally locked in a full tank level position, a spring loaded striker for applying a rapid downward, valve closing thrust to said flapper valve when the latter is in an open position, loading means for said striker operated by said second operating means, and means releasing said water level responsive means substantially simultaneously with the opening of said flapper valve by said second operating means when the latter is actuated by said handle means, said released water level responsive means coacting to release said striker and initiate said valve closing thrust when the water level in the tank drops to said predetermined lower level.

2. In the toilet flush tank defined in claim 1 in which said releasing means includes means for maintaining said release of the water level responsive means during refilling of the tank and for said locking thereof when the water level in the tank refills to approximately said full tank level.

3. In the toilet flush tank defined in claim 1 in which an opening is formed in a front wall of said tank positioned adjacent an upper corner thereof; a plate mounted on the interior of said front wall having an opening registering with said front wall opening, said first and second operating means each including a lever pivotally mounted on said plate, a housing secured to said overflow tube, said water level responsive means and said releasing means for the water level responsive means being mounted on said housing, and said striker being mounted on said housing for vertical movement between a raised position for said spring loading and a lowered position after completion of said valve closing thrust.

4. In the toilet flush tank defined in claim 3 in which said loading means for said striker includes a lost motion connection between each of said first and second operating means and said striker for raising the latter from said lowered position to said raised position when each operating means is actuated by said handle.

5. In the toilet flush tank defined in claim 1 in which said tank has a front wall and said selective flush mechanism has a housing mounted on said overflow tube, said housing comprising a first vertical sidewall extending substantially parallel to said tank front wall and a second vertical sidewall extending perpendicularly to said first vertical sidewall, said water level responsive means comprising an arm pivoted at one end to said housing first side wall for movement in a vertical plane, a float attached to the opposite free end of said arm, a transport mounted on said first sidewall for limited vertical reciprocation and a link connecting said transport to move with said pivoted arm.

6. In the toilet flush tank defined in claim 5 in which said striker is mounted on said housing first sidewall for vertical movement between a raised position for said spring loading and a lowered position after completion of said valve closing thrust, detent means pivotally mounted on said first sidewall releasably locking said striker in said raised, spring loaded position, and a contact mounted on said transport for actuating said detent means to release said striker, said detent and transport mounted contact serving as means for effecting said released water level responsive means coacting release of said striker.

7. In the toilet flush tank defined in claim 6 in which said transport has pin means extending laterally beyond said housing second sidewall, said releasing means including a float control assembly mounted on said housing second sidewall having a slot located beyond said housing first sidewall in operative engagement with said pin means.

8. In the toilet flush tank defined in claim 3 in which said striker is formed as an elongated rod terminating at the lower end in a bumper for contacting said flapper valve to effect said valve closing thrust and connects at the upper end to a pair of wires, a first of said wires having a lost motion connection to said second operating means lever as said loading means for the striker, a second of said wires having a lost motion connection to said first operating means lever whereby said striker is raised to said loaded position upon actuation of either said first or second operating means by said handle when said striker is in a lowered position prior to said handle actuation.

9. In the toilet flush tank defined in claim 8 in which said elongated rod has a midportion formed with a shoulder, detent means pivotally mounted on said housing releasably locking said rod in said raised, spring loaded position, said released water level responsive means actuating said detent means thereby effecting said coacting release of said striker.

10. In the toilet flush tank defined in claim 3 in which said handle and selective actuating means has a rotatable shaft mounting both said handle and a rocker arm to rotate therewith, a bushing extending through said front wall and plate openings comprising said plate mounting and securing the plate against said front wall, said shaft being journaled in said bushing, said rocker arm having opposite ends, each of said levers having an end extending for engagement by one of said rocker arm opposite ends whereby rotation of said handle in one direction actuates the first of said levers and rotation of the handle in the opposite direction actuates the second of said levers.

11. In a toilet flush tank having a front wall formed with an opening positioned adjacent an upper corner thereof, an overflow tube having an open upper end, a valve seat associated with said tube through which water from the tank discharges into the toilet bowl, a flapper valve for said valve seat, and a ballcock valve and float for maintaining the water in said tank at a full level; a selective flush mechanism for discharging either a full tank of water or a fractional portion of said tank of water indicated by a drop in the level of water from the full tank level to a predetermined lower level, said selective flush mechanism comprising a plate mounted on the interior of said front wall having an opening registering with said front wall opening, a handle mounted on a shaft journaled in said front wall and plate openings, first and second levers pivotally mounted on said plate, said shaft having means for selectively actuating either said first lever or second lever upon rotation of said handle in either of opposite directions, separate means connecting each of said first and second levers to said flapper valve for opening the latter when either is selectively actuated by said handle rotation, a housing mounted on said overflow tube comprising a first vertical sidewall extending substantially parallel to said tank front wall and a second vertical sidewall extending perpendicularly to said first vertical sidewall, a spring loaded striker mounted on said first sidewall for applying a rapid downward, valve closing thrust to said flapper valve when the latter is in an open position, loading means for said striker operated for independent action by said first and second levers, water level responsive means mounted on said first sidewall coacting to release said striker and initiate said valve closing thrust when the water level in the tank drops to said predetermined level, a control assembly mounted on said second sidewall for normally locking said water level responsive means in a full tank level position and releasing said water level responsive means and maintaining said release until the tank refills to approximately the full tank level after said flapper valve closing at said predetermined water level, and means interconnecting said second lever and said control assembly for operation of the latter substantially simultaneously with said flapper valve opening when said second lever is actuated by said handle.

12. In the toilet flush tank defined in claim 11 in which said second lever and control assembly interconnecting means includes a pendant pivotally mounted on said second sidewall for swinging movement in a plane perpendicular to the latter from a vertical downwardly suspended, normal rest position for latching said control assembly to a raised, disengaged position when actuated by said second lever, a latch pin having a free end projecting from said pendant toward said second sidewall, said control assembly comprising a cam-lever pivotally mounted at a midportion thereof on said second sidewall between the latter and said pendant and having an end portion, an edge portion and a cam surface facing said pendant, said end portion being connected to said water level responsive means for movement therewith, said edge portion being located for engagement by latch pin when said pendant is in said rest position serving as said control assembly normal locking of the water level responsive means, said cam surface being located for engagement by said latch pin free end permitting movement of said cam-lever as said release maintenance of said water level responsive means.

13. In the toilet flush tank defined in claim 12 in which an upper curved cam edge is formed on a portion of said cam-lever opposite said end portion and said pendent has a second latch pin of a length longer than and extending in spaced relation above said first mentioned latch pin, said control assembly including a flag-cam pivotally mounted on said second sidewall partially interposed between said cam-lever and said second sidewall, said flag-cam having an edge portion, a cam surface and a cam follower pin extending to engage said upper curved cam edge of the cam-lever, spring means biasing said flag-cam for pivoting in a direction for urging said cam follower pin against said cam-lever upper curved cam edge and and for engagement between said edge portion thereof and said second latch pin when the pendant is in said rest position.

14. In a toilet flush tank having an overflow tube, a valve seat associated with said tube through which water from the tank discharges into the toilet bowl, a flapper valve for said valve seat, and a ballcock valve and float for maintaining the water in said tank at a full level; a sective flush mechanism comprising a first operating means opening said flapper valve to initiate discharge of a full tank of water, a second operating means opening said flapper valve to initiate discharge of a fractional portion of said tank of water indicated by a drop in the level of water from the full tank level to a predetermined lower level, a handle having means for selectively actuating either said first or second operating means, water level responsive means normally locked in a full tank level position, a striker for applying a rapid downward, valve closing thrust to said flapper valve when the latter is in an open position, means mounting said striker on said overflow tube for vertical movement between a raised, spring loaded position and a lowered position after completion of said valve closing thrust, a lost motion connection between each of said first and second operating means and said striker for raising the latter from said lowered position to said raised position when either operating means is actuated by said handle means, a latch assembly releasably locking said striker in said raised position, and means actuated by said second operating means releasing said water level responsive means substantially simultaneously with the opening of said flapper valve when said second operating means is actuated by said handle means, said released water level responsive means coacting with said latch assembly to release said striker and initiate said valve closing thrust when the water level in the tank drops to said predetermined lower level.

* * * * *